United States Patent [19]

Gerhard

[11] Patent Number: 5,085,544
[45] Date of Patent: Feb. 4, 1992

[54] EXPANDING PLUG AND A METHOD TO MANUFACTURE SAME

[75] Inventor: Anton Gerhard, Nuremberg, Fed. Rep. of Germany

[73] Assignee: Toge-Dübel A. Gerhard GmbH, Nuremburg, Fed. Rep. of Germany

[21] Appl. No.: 591,893

[22] Filed: Oct. 2, 1990

[30] Foreign Application Priority Data

Oct. 6, 1989 [DE] Fed. Rep. of Germany ....... 3933353

[51] Int. Cl.⁵ .............................................. F16B 13/04
[52] U.S. Cl. .......................................... 411/33; 411/75
[58] Field of Search ................. 411/55, 60, 32, 33, 411/74, 61, 62, 71, 75, 79, 70, 15, 44, 78; 405/259

[56] References Cited

U.S. PATENT DOCUMENTS

| 2,241,343 | 5/1941 | Fleaca ................................. 411/61 |
| 4,475,856 | 10/1984 | Toomingas .......................... 411/33 |
| 4,523,881 | 6/1985 | Ringe ................................. 405/259 |

FOREIGN PATENT DOCUMENTS 0041983 12/1984 European Pat. Off. .
1814485 6/1970 Fed. Rep. of Germany ........ 411/33
2138246 3/1973 Fed. Rep. of Germany .
2714547 5/1978 Fed. Rep. of Germany .
2711845 9/1978 Fed. Rep. of Germany .
3331496 4/1985 Fed. Rep. of Germany .
319996 11/1902 France ................................. 411/55
121499 4/1948 Sweden ............................... 411/74

Primary Examiner—Rodney M. Lindsey
Attorney, Agent, or Firm—Browdy and Neimark

[57] ABSTRACT

An expanding plug comprises an expanding sleeve made in one piece and provided with a continuous longitudinal slot, an expanding body arranged in the expanding sleeve, and a screw engaging with a thread in the expanding body and bearing with its head against a rim of the expanding sleeve. On its external wall the expanding body is provided with several expanding surfaces one arranged behind the other in longitudinal direction, which bear against associated inclined surfaces on the internal surface of the expanding sleeve. For the purpose of creating an embodiment particularly simple in design and manufacture, the inclined surfaces are provided on the projections of the expanding sleeve directed radially inwards and engaging with recesses of the expanding body 2 limiting the expanding surfaces.

12 Claims, 3 Drawing Sheets

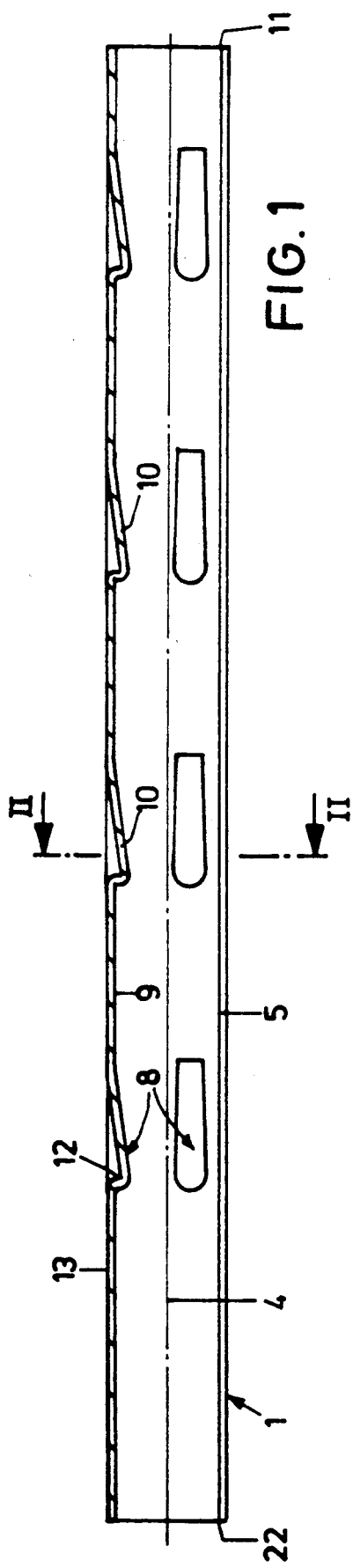
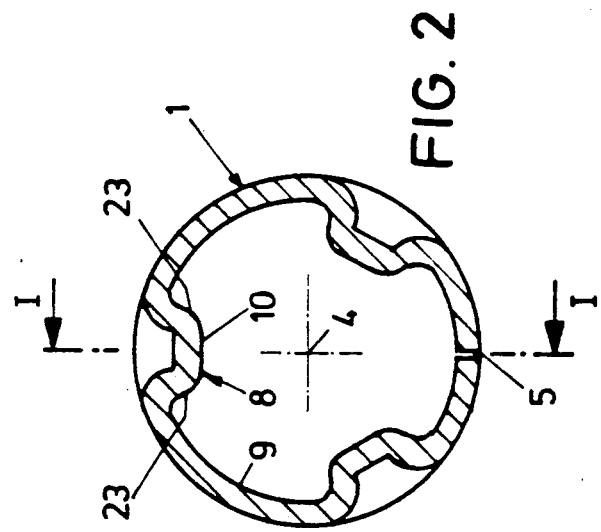
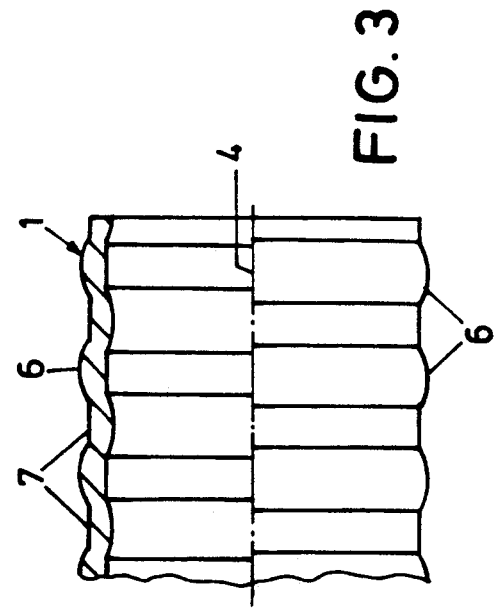

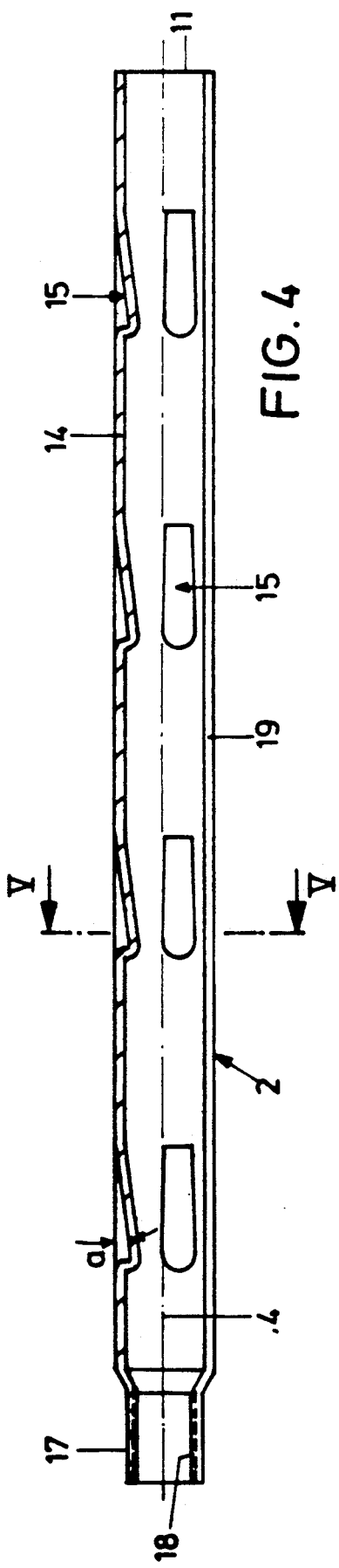
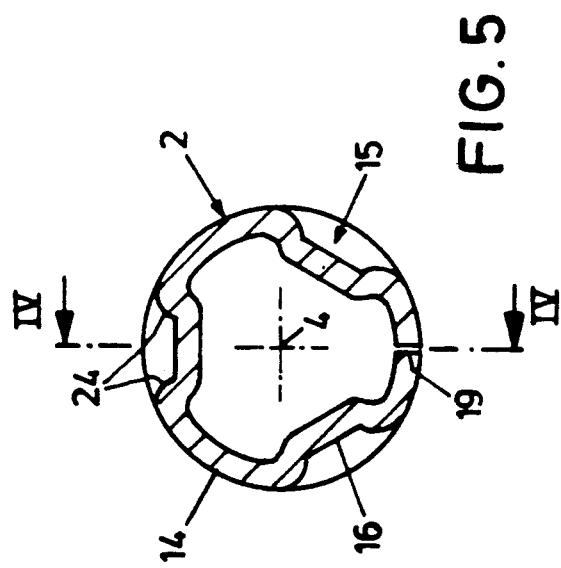

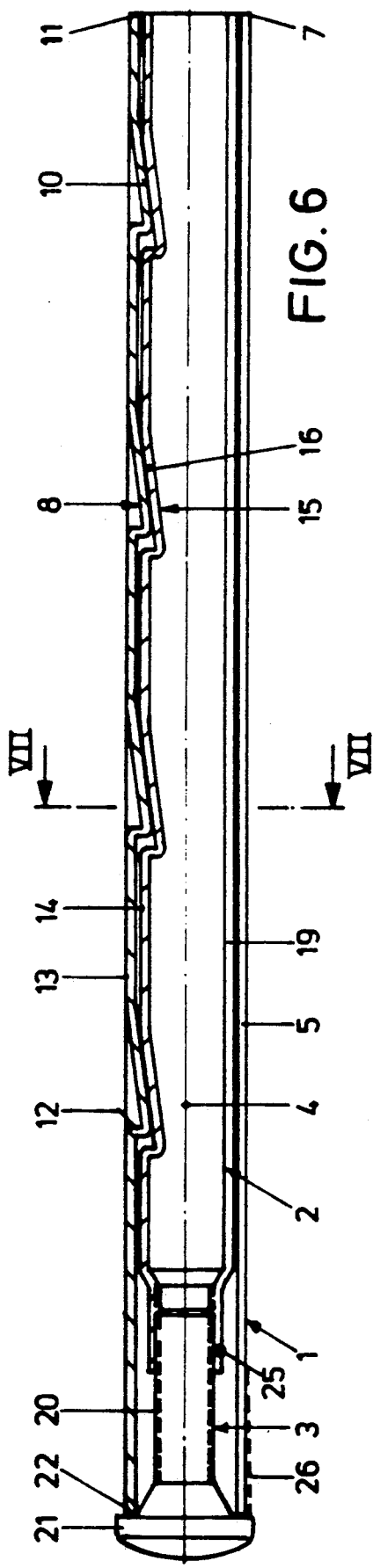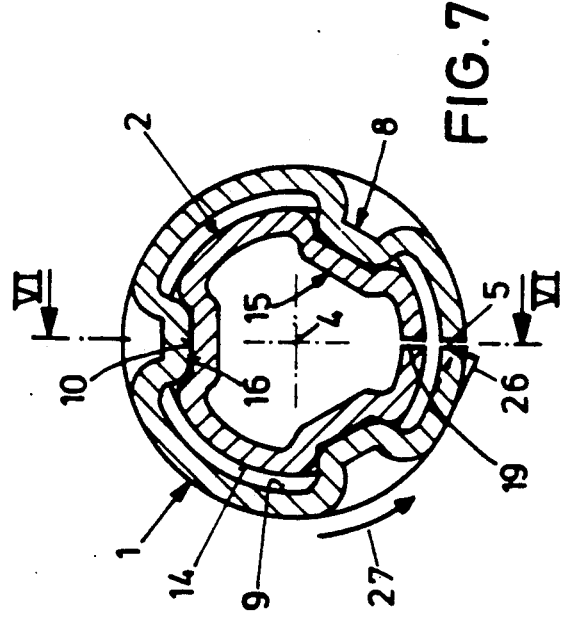

EXPANDING PLUG AND A METHOD TO MANUFACTURE SAME

FIELD OF THE INVENTION

The invention relates to an expanding plug comprising an expanding sleeve made in one piece and provided with a continuous longitudinal slot, an expanding body arranged in the expanding sleeve and a screw engaging with a thread in the expanding body and bearing with its head against a rim of the expanding sleeve, the expanding body being provided on its external surface with several expanding surfaces arranged one behind the other in longitudinal direction, which bear against associated inclined surfaces on the internal surface of the expanding sleeve, and to a method for the manufacturing of an expanding plug.

BACKGROUND OF THE INVENTION

An expanding plug of the generic kind is known from German patent 16 25 394. In this case the thick-walled slotted expanding sleeve is provided with a conical inclined surface widening outwards, thus being frusto-conical, at its plug-in end facing away from the head of the screw. It is followed by a circular cylindrical inner wall section followed by a further conical inclined surface in turn tapering in the direction towards the head of the screw. The inner space of the expanding sleeve is passed through by the screw bolt which engages with a conical expanding body bearing against the inclined surface with an equally inclined conical expanding surface at the plug-in end of the expanding sleeve. A further expanding body is provided, which is associated with the inclined surface of minor diameter. Both expanding bodies are connected with one another by way of a spacing sleeve. The advantage of this expanding plug resides in that it practically expands uniformly over its total length. On the other hand it is very expensive to manufacture. Furthermore, the expanding bodies and the spacing sleeves fall out of the expanding sleeve when the screw is screwed out.

An expanding plug is known from German published patent application 27 11 845 having an expanding body with several expanding surfaces one arranged behind the other in longitudinal direction. The expanding body may be rolled from metal sheet with these expanding surfaces being provided on cams punched out of the wall of the expanding body outwards. Several jaws are arranged around this expanding body and held together by means of gripping rings. These jaws, too, may be punched out of metal sheet, with conically extending cams being provided having inclined surfaces associated with the expanding surfaces. In this case, too, the expanding body is not held between the jaws in such a way that it cannot get lost. Moreover, a disadvantage resides in that upon expansion the gripping rings must either be torn or consist of an elastic material adversely affecting the stability of the plug.

It is generally known to manufacture the expanding sleeves of expanding plugs in one piece from a sheet blank by bending.

SUMMARY OF THE INVENTION

It is the object of the invention to embody an expanding plug of the generic type in such a way that, while being particularly simple in design and manufacture, the expanding body is held in the expanding sleeve such that it cannot be lost.

This object is attained in accordance with the invention by the inclined surfaces being provided on projections of the expanding sleeve directed radially inwards and engaging with recesses of the expanding body limiting the expanding surfaces. Due to the fact that, on the one hand, the expanding sleeve is manufactured in known manner in one piece and that, on the other hand, the projections of the expanding sleeve protruding radially inwards engage with the associated recesses of the expanding body, the expanding body cannot fall out of the expanding sleeve even when the screw is removed.

An embodiment of the expanding sleeve particularly simple in design and manufacture is attained by providing several projections over the circumference of the expanding sleeve. In particular when combined with the measure of providing several recesses matching with the projections over the circumference of the expanding body, this results in that in a particularly simple manner the expanding body is arranged in the expanding sleeve in an untwistable manner in relation to the latter.

The measures consisting in that the projections have side walls extending approximately in longitudinal direction and guided along corresponding flanks of the recesses, result in that the expanding sleeve is expanded substantially over its full length. The embodiment according to which the expanding body is provided with a threaded sleeve for the screw at its end facing the head of the screw, results in that, related to the length of the expanding sleeve, only a very short screw is necessary so that the screw does not extend through the full length of the expanding plug—as usual.

The further embodiment consisting in that the expanding sleeve is provided with annular projections of little radial extension on its external wall results in that a reliable anchoring of the expanding plug in brickwork or concrete is achieved on the one hand and that the plug also reliably braces in the part to be secured on the other hand.

The simplest embodiment of the expanding body and the expanding sleeve consists in that the expanding body is bent from a sheet bland made in one piece and that the expanding sleeve is bent from a sheet blank made in one piece. The embodiment of the expanding plug according to the invention results in that a particularly simple method of manufacturing can be applied, in which a sheet blank for the expanding sleeve is provided with inclined surfaces and is then bent around the finished expanding body.

Further advantages, features and details of the invention will become apparent from the ensuing description of an exemplary embodiment taken in conjunction with the drawing.

BRIEF DESCRIPTION OF THE DRAWING

FIG. 1 shows an expanding sleeve of a plug according to the invention in a longitudinal section along the line I—I in FIG. 2;

FIG. 2 is a cross-section through the expanding sleeve along the line II—II in FIG. 1 on a strongly enlarged scale;

FIG. 3 shows a partial top view of the expanding sleeve in a partially broken up representation and on a strongly enlarged scale;

FIG. 4 shows an expanding body of a plug in a longitudinal section along the line IV—IV in FIG. 5;

FIG. 5 is a cross-section through the expanding body along the line V—V in FIG. 4 on a strongly enlarged scale;

FIG. 6 shows the plug formed by the expanding sleeve according to FIGS. 1 to 3 and the expanding body according to FIGS. 4 and 5 in a longitudinal section; and FIG. 7 is a cross-section through the plug according the line VII—VII in FIG. 6.

DESCRIPTION OF THE PREFERRED EMBODIMENT

The plug represented in the drawing consists of an outer expanding sleeve 1, of a hollow expanding body 2 arranged in this expanding sleeve 1 and extending over a large part of its length, and of a screw 3. The expanding sleeve 1 is approximately annular cylindrical in shape and formed of metal sheet. Consequently, it has a longitudinal slot 5 extending over its full length and running parallel to the central longitudinal axis 4. As can only be seen from FIG. 3, it is provided on its outer circumference with an annular corrugation formed by annular projections 6, of which the radial distance from the wave bottom 7 situated between two projections 6 amounts to 0.1 to 0.3 mm. These annular projections 6 of little radial height serve to anchor or to brace, respectively, in the subsoil, i.e. in brickwork, concrete or the like, and in the part to be secured, when the expanding sleeve 1 is expanded.

As can be seen from FIGS. 1 and 2, projections 8 directed radially inwards, i.e. towards the axis 4, are provided in the expanding sleeve 1, which are distributed at regular intervals over its length and arranged at uniform angular distances over its circumference, and which thus appear as recesses on the external wall of the expanding sleeve 1. These projections 8 limit inclined surfaces 10 slightly sloping on the internal surface 9 of the expanding sleeve 1 towards the axis 4, with each inclined surface 10 sloping towards the axis 4 seen from the plug-in end 11 of the expanding sleeve 1. The end of the projection 8 which faces in each case away from the plug-in end 11 of the expanding sleeve 1, and at which the inclined surface 10 is closest to the axis 4, is followed by a short wall section 12 extending approximately perpendicular to the axis 4 and leading back again to the largely cylindrical external wall 13 of the expanding sleeve 1. It has an outer diameter which is only slightly smaller than the inner diameter of the expanding sleeve 1. On its external surface the expanding body 2 has recesses 15 which each have an expanding surface 16 lying outside. Seen from the plug-in end 11, these expanding surfaces 16 are inclined towards the axis 4, and that by the same angle a as the inclined surfaces 10. The recesses 15 are arranged over the length of the expanding body and over its circumference in the same way as the projections 8 on the expanding sleeve 1. Seen in the circumferential direction of the expanding body 2, the recesses 15 are about as wide as the projections 8 on the internal surface 9 of the expanding sleeve, so that in each case a projection 8 engages with a recess 15, with each inclined surface 10 bearing against an associated expanding surface 16 as shown in FIG. 6, where for reasons of diagrammatic simplification only one row of engaging projections 8 and recesses 15 is shown.

The expanding body 2 has a necked-down threaded sleeve 17 with an inner thread 18 at its side facing away from the plug-in end 11. The expanding body 2 is bent of metal sheet and, consequently, has a joint gap 19.

After the expanding body 2 has been produced the sheet blank of the expanding sleeve 1 provided with the projections 8 and annular projections 6 is bent around the hollow expanding body 2, the expanding body 2 having been placed on the sheet blank of the expanding sleeve 1 in such a manner that the projections 8 engage with the recesses 15. Then the sheet blank of the expanding sleeve 1 is bent around the expanding body. The expanding body thus rests safe from twisting in the expanding sleeve 1. Then the screw 3 is screwed with its cylindrical threaded section 20 into the inner thread 18 of the threaded sleeve 17 such that the head 21 of the screw 3 bears against the adjacent rim 22 of the expanding sleeve 1. When the screw 3 is fastened after the whole plug has been plugged into a bore, the expanding body 2 is pulled in a direction towards the rim 22 of the expanding sleeve 1, i.e. away from the plug-in end 11 of the latter, whereby the inclined surfaces 10 are pressed radially outwards by the expanding surfaces 16, thus expanding the expanding sleeve 1 by widening its slot 5. The expanding sleeve 1 is braces in the brickwork or the concrete, its projections 6 pressing into the brickwork. There is no risk that the threaded sleeve 17 might be bent up, since the whole expanding body 2 is compressed over its circumference, i.e. tangentially, when the expanding sleeve 1 is expanded.

The expanding surfaces 16 of the expanding body 2 can extend over the total circumference of the expanding body 2, i.e. they can altogether have the shape of a truncated cone. However, such a design has the disadvantage that the expanding body 2 is not arranged safe from twisting in the expanding sleeve 1, but that then a special safety device must be provided to prevent twisting. In the embodiment shown the measures to prevent twisting consist in that the side walls 23 of each projection 8 extending parallel to the axis 4 are guided between the flanks 24 of the corresponding recess 15 extending about in the same direction, as can be seen from FIG. 7.

The diameter of the threaded section 20 of the screw 3 is smaller than the smallest radial distance of the recesses 15 from the axis 4.

For safety purposes the threaded sleeve 17 can be tightly closed by a point-like or line-shaped welding 25 at its joint gap 19.

The expanding sleeve 1 ends with a wave bottom 7 at its plug-in end 11 so as to facilitate the plugging in of the expanding sleeve 1 into a bore, which is indicated in FIG. 6 only by the reference 7.

As a further safety measure to prevent twisting the expanding sleeve 1 is provided with a bulging 26 in the vicinity of the screw 3, i.e. starting from its rim 22. This bulging 26 protrudes from the outer contour of the expanding sleeve 1 in the vicinity of the slot 5. This bulging 26 is located on the side of the slot 5 lying in front in the direction of rotation 27 of the screw 3. The bulging 26 extends to the threaded sleeve 17 at maximum when the plug is not expanded, as shown by a dashed line in FIG. 6, since the bulging 26 per se is not visible in FIG. 6.

What is claimed is:

1. An expanding plug comprising:
    an expanding sleeve (1) made in one piece and provided with a continuous longitudinal slot (5), and with an internal surface (9), on which a plurality of inclined surfaces (10) are provided spaced longitudinally in rows with rows spaced circumferentially, and with a rim (22) at one end of the expanding sleeve (1);

an expanding body (2) arranged in the expanding sleeve (1) and having an inner thread (18) and provided on an external surface (14) with a plurality of rows of expanding surfaces (16) one arranged behind the other in a longitudinal direction of the expanding body (2) and bearing against said inclined surfaces (10); and a screw (3) having an external thread engaging with the inner thread (18) of the expanding body (2), and with a head (21) bearing against the said rim (22) of the expanding sleeve (1);

wherein the inclined surfaces (10) are provided on projections (8) of the expanding sleeve (1) directed radially inwards and engaging with recesses (15) of the expanding body (2) limiting the expanding surfaces (16); and wherein the projections (8) of the expanding sleeve (1) have side walls (23) extending approximately in said longitudinal direction and wherein the recesses (15) of the expanding body (2) have flanks (24) extending approximately in said longitudinal direction and wherein said projections (8) are guided along said flanks (24).

2. An expanding plug according to claim 1, wherein the expanding body (2) is provided with a sleeve (17), which is provided with said inner thread (18) and which faces said head (21) of the screw (3).

3. An expanding plug according to claim 1, wherein the expanding sleeve (1) has an external wall (13) which is provided with annular projections (6) of a radial extension of less than 1 mm.

4. An expanding plug comprising:
an expanding sleeve (1) bent from a sheet metal blank made in one piece and provided with a continuous longitudinal slot (5), and with an internal surface (9), on which inclined surfaces (10) are provided, and with a rim (22) at one end of the expanding sleeve (1);

an expanding body (2) bent from a sheet blank made in one piece, arranged in the expanding sleeve (1) and having an inner thread (18) and provided on an external surface (14) with several expanding surfaces (16) one arranged behind the other in a longitudinal direction of the expanding body (2) and bearing against said inclined surfaces (10); and a screw (3) having an external thread engaging with the inner thread (18) of the expanding body (2), and with a head (21) bearing against the said rim (22) of the expanding sleeve (1);

wherein the inclined surfaces (10) are provided on projections (8) of the expanding sleeve (1) directed radially inwards and engaging with recesses (15) of the expanding body (2) limiting the expanding surfaces (16), said projections (8) cooperating with said recesses (15) to provide means for expanding said expanding sleeve (1) by widening its slot (5) on pulling of the expanding body (2) in a direction toward the rim (22) of the expanding sleeve (1) to cause the inclined surfaces (10) to press outwardly from the action of the expanding surfaces (16).

5. An expanding plug according to claim 4, wherein several projections (8) are provided over the circumference of the expanding sleeve (1).

6. An expanding plug according to claim 5, wherein several recesses (15) are provided over the circumference of the expanding body (2), which recesses (15) match with the projections (8) of the expanding sleeve (1).

7. An expanding plug according to claim 6, wherein the projections (8) of the expanding sleeve (1) have side walls (23) extending approximately in said longitudinal direction and wherein the recesses (15) of the expanding body (2) have flanks (24) extending approximately in said longitudinal direction and wherein said projections (8) are guided along said flanks (24).

8. An expanding plug according to claim 4, wherein the expanding body (2) is provided with a sleeve (17), which is provided with said inner thread (18) and which faces said head (21) of the screw (3).

9. An expanding plug according to claim 4, wherein the expanding sleeve (1) has an external wall (13) which is provided with annular projections (6) of a radial extension of less than 1 mm.

10. An expanding plug comprising:
an expanding sleeve (1) bent from a sheet metal blank made in one piece and provided with a continuous longitudinal slot (5), and with an internal surface (9), on which a plurality of inclined surfaces (10) are provided spaced longitudinally in rows with rows spaced circumferentially, and with a rim (22) at one end of the expanding sleeve (1);

an expanding body (2) bent from a sheet blank made in one piece arranged in the expanding sleeve (1) and having an inner thread (18) and provided on an external surface (14) with a plurality of rows of expanding surfaces (16) one arranged behind the other in a longitudinal direction of the expanding body (2) and bearing against said inclined surfaces (10); and screw (3) having an external thread engaging with the inner thread (18) of the expanding body (2), and with a head (21) bearing against the said rim (22) of the expanding sleeve (1);

wherein the inclined surfaces (10) are provided on projections (8) of the expanding sleeve (1) directed radially inwards and engaging with recesses (15) of the expanding body (2) limiting the expanding surfaces (16); and wherein the projections (8) of the expanding sleeve (1) have side walls (23) extending approximately in said longitudinal direction and wherein the recesses (15) of the expanding body (2) have flanks (24) extending approximately in said longitudinal direction and wherein said projections (8) are guided along said flanks (24).

11. An expanding plug according to claim 11, wherein the expanding body (2) is provided with a sleeve (17), which is provided with said inner thread (18) and which faces said head (21) of the screw (3).

12. An expanding plug according to claim 10, wherein the expanding sleeve (1) has an external wall (13) which is provided with annular projections (6) of a radial extension of less than 1 mm.

* * * * *